United States Patent
Cao et al.

(10) Patent No.: US 11,564,548 B2
(45) Date of Patent: Jan. 31, 2023

(54) CLEANING ROBOT CAPABLE OF SIMULTANEOUSLY DRIVING A DRIVING WHEEL AND AN IMPELLER BY SINGLE MOTOR

(71) Applicant: Ningbo Pulefei Intelligent Technology Co.,Ltd., Zhejiang (CN)

(72) Inventors: Xin Cao, Zhejiang (CN); Weijin Li, Zhejiang (CN)

(73) Assignee: POOLELF SMART TECHNOLOGY CO., LTD., Huaian (CN)

(*) Notice: Subject to any disclaimer, the term of this patent is extended or adjusted under 35 U.S.C. 154(b) by 258 days.

(21) Appl. No.: 17/161,884

(22) Filed: Jan. 29, 2021

(65) Prior Publication Data

US 2022/0240745 A1    Aug. 4, 2022

(51) Int. Cl.
*A47L 11/40* (2006.01)
*A47L 5/22* (2006.01)
*A47L 9/00* (2006.01)
*A47L 9/28* (2006.01)

(52) U.S. Cl.
CPC ............. *A47L 11/4066* (2013.01); *A47L 5/22* (2013.01); *A47L 9/009* (2013.01); *A47L 9/2842* (2013.01); *A47L 9/2852* (2013.01); *A47L 11/4069* (2013.01)

(58) Field of Classification Search
CPC ........ A47L 11/4066; A47L 5/22; A47L 9/009; A47L 9/2842; A47L 9/2852; A47L 11/4069; A47L 2201/00
See application file for complete search history.

(56) References Cited

U.S. PATENT DOCUMENTS

| 9,752,665 B2 * | 9/2017 | Yang ................. H02K 7/116 |
| 2016/0153535 A1 * | 6/2016 | Yang ................. F16H 37/0826 475/5 |

FOREIGN PATENT DOCUMENTS

| CN | 201366711 Y | * 12/2009 | |
| CN | 103654640 A | 3/2014 | |
| CN | 205479213 U | 8/2016 | |
| CN | 208152635 U | 11/2018 | |
| CN | 208380175 U | 1/2019 | |
| CN | 110762030 A | * 2/2020 | |
| CN | 111267954 A | * 6/2020 | |
| DE | 10242257 B4 | * 12/2013 | ............. A47L 11/33 |
| KR | 20170077756 A | * 7/2017 | |
| KR | 20220093022 A | * 5/2022 | |
| WO | WO-2022129076 A1 | * 6/2022 | |

* cited by examiner

Primary Examiner — Marc Carlson

(57) ABSTRACT

Disclosed is a cleaning robot capable of simultaneously driving a driving wheel and an impeller by a single motor, including a motor output shaft, a driving wheel provided with a second rotating shaft and an impeller provided with a first rotating shaft; a connector is connected between the motor output shaft and the first rotating shaft; and a speed reducer is connected between the connector and the second rotating shaft. The cleaning robot moves forward and backward and makes a turn by the driving wheel, allows wastes to enter an internal filter element under the action of negative pressure generated by the internal impeller, and discharges the purified water or air out of the equipment. The present invention can simultaneously drive the impeller and the driving wheel by using only one motor and can enable the driving wheel and the impeller to generate different rotating speeds.

10 Claims, 8 Drawing Sheets

CLEANING ROBOT CAPABLE OF SIMULTANEOUSLY DRIVING A DRIVING WHEEL AND AN IMPELLER BY SINGLE MOTOR

TECHNICAL FIELD

The present invention relates to the field of cleaning equipment, in particular to a cleaning robot capable of simultaneously driving a driving wheel and an impeller by a single motor.

BACKGROUND OF THE PRESENT INVENTION

Cleaning robots are classified into underwater cleaning robots and dryland cleaning robots, which have similar principles and all move forward and backward and make a turn by the driving wheel, allow wastes to enter an internal filter element under the action of negative pressure generated by the internal impeller and discharge the purified water or air out of the machine through the impeller. For example, the patent with a title "Underwater Cleaning Robot" having a publication patent number CN208380175U discloses a similar underwater cleaning robot, wherein the underwater cleaning robot drives an impeller to pump water by one motor, drives one driving wheel to rotate by the other motor and drives other wheels to rotate by a belt pulley. However, such a cleaning robot requires two motors to provide power of different rotating speeds for the driving wheel and the impeller.

The two motors are arranged inside the cleaning robot, which not only increases the weight of the equipment, but also occupies the internal space and further increases the product cost.

SUMMARY OF THE PRESENT INVENTION

The technical problem to be solved by the present invention is to provide a cleaning robot capable of simultaneously driving a driving wheel and an impeller by a single motor and featured with compact structure, reasonable layout, stable operation, low cost and light weight in view of the status of the prior art.

A technical solution adopted by the present invention to solve the above technical problem is that: a cleaning robot capable of simultaneously driving a driving wheel and an impeller by a single motor includes a driving wheel, an impeller, a cavity for accommodating the impeller, and discharge ports for communicating the cavity with the outside, wherein the impeller is provided with a first rotating shaft; the driving wheel is provided with a second rotating shaft; a first channel is arranged between the cavity and the filter element; a connector is connected between the motor output shaft and the first rotating shaft; and a speed reducer is connected between the connector and the second rotating shaft.

To optimize the above technical solution, the measures taken also include:

In one solution, the connector is a fixed part synchronously connected with the motor output shaft and the first rotating shaft; and in another solution, the connector is a planetary gear reduction mechanism for connecting the motor output shaft with the first rotating shaft. Two cases for the speed reducer can be selected. The first case is that, when the second rotating shaft is parallel to the first rotating shaft, the speed reducer is either a planetary gear reduction mechanism or a belt pulley; and the second case is that, when the second rotating shaft and the first rotating shaft are located on the same axis, the speed reducer is a planetary gear reduction mechanism.

The above cavity is located in the driving wheel; and the discharge ports are located on the driving wheel. The first channel is located on the second rotating shaft. A second channel for connecting the first channel with the cavity is arranged in the second rotating shaft. The second rotating shaft is sleeved on the periphery of the first rotating shaft. The planetary gear reduction mechanism is provided with a shaft hole for allowing the rotation of the first rotating shaft.

The above planetary gear reduction mechanism includes a first planetary gear reducer and a second planetary gear reducer. The second planetary gear reducer includes a fixed second internal gear ring, a second planetary gear and a second sun gear which are arranged in the second internal gear ring, and a second planetary frame arranged between the second sun gear and the first planetary gear reducer. The first planetary gear reducer includes a first sun gear arranged on the second planetary frame, a first internal gear ring synchronously connected to the second rotating shaft, and a first planetary gear with a rotating shaft arranged on the second internal gear ring. The connector includes a third sun gear fixed on the motor output shaft, a third planetary gear in meshing transmission with the third sun gear and the second internal gear ring, and a fourth planetary frame arranged between the third sun gear and the second planetary gear reducer. The second sun gear is arranged on the fourth planetary frame; and the first rotating shaft is fixed on the fourth planetary frame.

A fifth planetary frame fixed on the fourth planetary frame is arranged between the third planetary gear and the motor. A third planetary frame fixed on the second planetary frame is arranged between the second planetary gear and the fourth planetary frame. The first planetary frame fixed on the second internal gear ring is arranged between the first planetary gear and the impeller.

Compared with the prior art, the cleaning robot capable of simultaneously driving the driving wheel and the impeller by the single motor according to the present invention includes the motor output shaft, the driving wheel and the impeller; the impeller is provided with the first rotating shaft; the driving wheel is provided with the second rotating shaft; the connector is connected between the motor output shaft and the first rotating shaft; and the speed reducer is connected between the connector and the second rotating shaft. The cleaning robot moves forward and backward and makes a turn by the driving wheel, allows wastes to enter the internal filter element under the action of negative pressure generated by the internal impeller, and discharges the purified water or air out of the equipment. The impeller motor output shaft according to the present invention drives the first rotating shaft and the impeller to rotate at a relatively high speed by the connector; and the connector can drive the driving wheel to rotate at a low speed by the speed reducer. Therefore, the present invention can simultaneously drive the impeller and the driving wheel by using only one motor and enables the driving wheel and the impeller to generate different rotating speeds. The present invention has the advantages that only one motor is used so that the equipment has compact structure, reasonable layout, stable operation, low cost and light weight.

DETAILED DESCRIPTION OF THE PRESENT INVENTION

Figure 1:
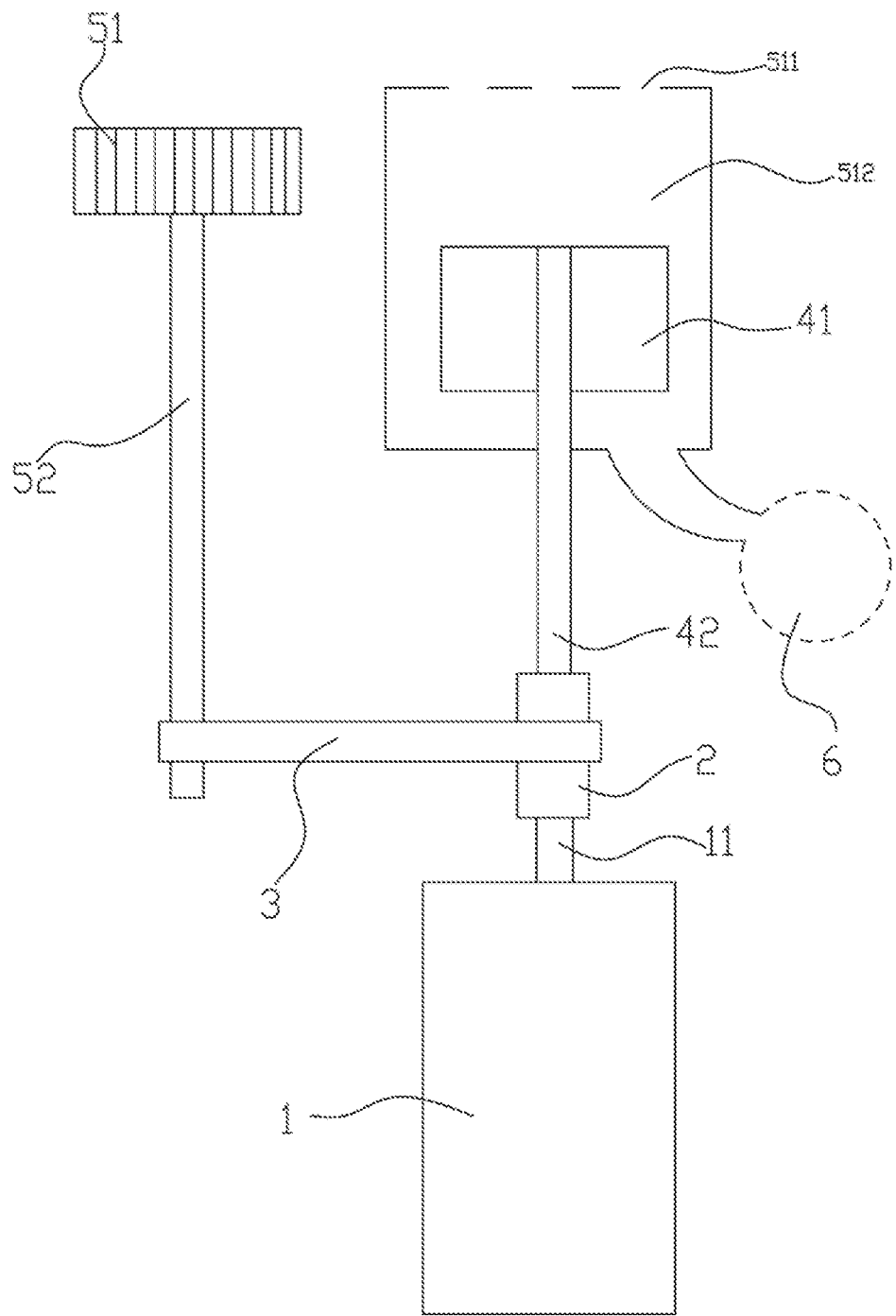
FIG. 1 is a structural schematic diagram of an embodiment 1, an embodiment 2 and an embodiment 3 of the present invention.
Figure 2:
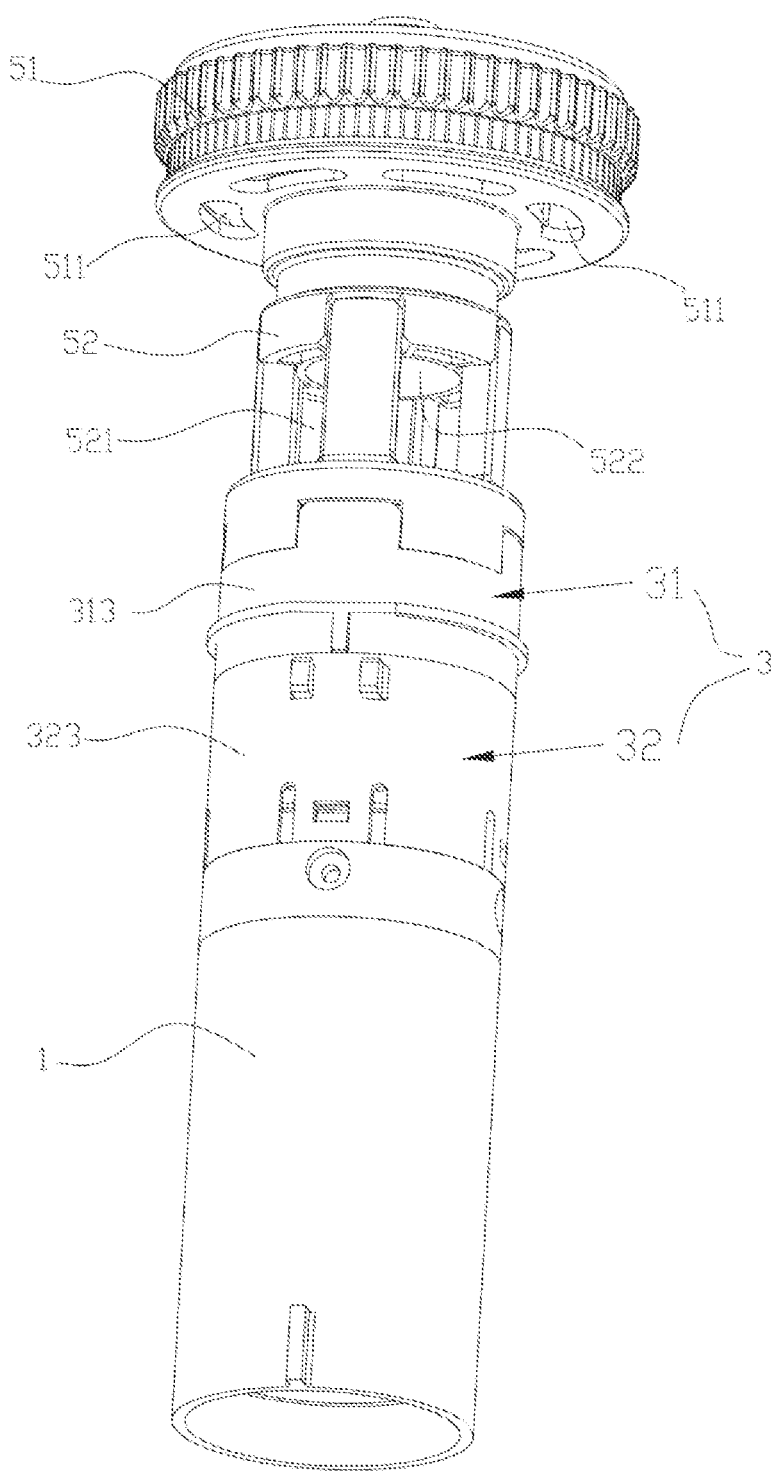
FIG. 2 is a structural schematic diagram of an embodiment 4 of the present invention.
Figure 3:
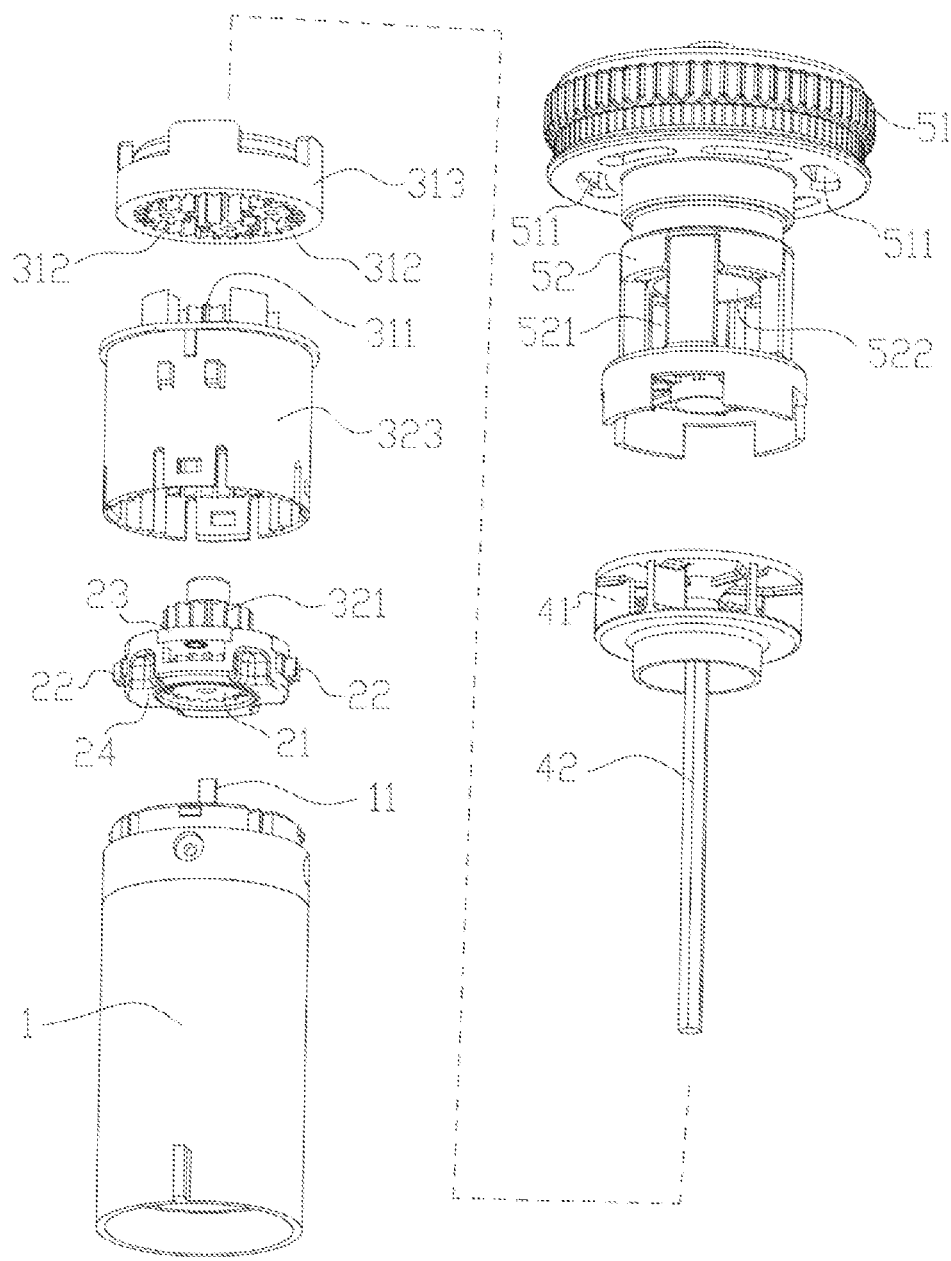
FIG. 3 is an exploded schematic diagram of FIG. 2.

Embodiments of the present invention will be further described in detail below with reference to the accompanying drawings.

The reference numerals are shown as follows: motor 1, motor output shaft 11, connector 2, third sun gear 21, third planetary gear 22, fourth planetary frame 23, fifth planetary frame 24, speed reducer 3, first planetary gear reducer 31, first sun gear 311, first planetary gear 312, first internal gear ring 313, first planetary frame 314, second planetary gear reducer 32, second sun gear 321, second planetary gear 322, second internal gear ring 323, second planetary frame 324, third planetary frame 325, impeller 41, first rotating shaft 42, driving wheel 51, discharge port 511, cavity 512, second rotating shaft 52, first channel 521, second channel 522 and filter element 6.

In an embodiment 1, as shown in FIG. 1, a cleaning robot capable of simultaneously driving a driving wheel and an impeller by a single motor includes a driving wheel 51, an impeller 41, a cavity 512 for accommodating the impeller 41, and discharge ports 511 for communicating the cavity 512 with the outside. The impeller 41 is provided with a first rotating shaft 42; and the driving wheel 51 is provided with a second rotating shaft 52. A first channel 521 is arranged between the cavity 512 and the filter element 6. A connector 2 is connected between the motor output shaft 11 and the first rotating shaft 42; and a speed reducer 3 is connected between the connector 2 and the second rotating shaft 52. The impeller 41 is fixed to the first rotating shaft 42; the driving wheel 51 is fixed to the second rotating shaft 52; the motor output shaft 11 drives the connector 2 to rotate; the connector 2 drives the first rotating shaft 42 and the impeller 41 to rotate; and the connector 2 is decelerated by the speed reducer 3 to drive the second rotating shaft 52 and the driving wheel 51.

In the present embodiment, the connector 2 is a fixed part synchronously connected with the motor output shaft 11 and the first rotating shaft 42; the second rotating shaft 52 is parallel to the first rotating shaft 42; and the speed reducer 3 is a planetary gear reduction mechanism.

In an embodiment 2, as shown in FIG. 1, the embodiment 2 is similar to the embodiment 1, except that the speed reducer 3 is a belt pulley.

In an embodiment 3, as shown in FIG. 1, the embodiment 3 is similar to the embodiment 2, except that the connector 2 is a planetary gear reduction mechanism for connecting the motor output shaft 11 with the first rotating shaft 42.

In an embodiment 4, as shown in FIGS. 2-8, a cleaning robot capable of simultaneously driving a driving wheel and an impeller by a single motor includes a driving wheel 51, an impeller 41, a cavity 512 for accommodating the impeller 41, and discharge ports 511 for communicating the cavity 512 with the outside. The impeller 41 is provided with a first rotating shaft 42; and the driving wheel 51 is provided with a second rotating shaft 52. A first channel 521 is arranged between the cavity 512 and a filter element 6. A connector 2 is connected between the motor output shaft 11 and the first rotating shaft 42; and a speed reducer 3 is connected between the connector 2 and the second rotating shaft 52. The impeller 41 is fixed to the first rotating shaft 42; the driving wheel 51 is fixed to the second rotating shaft 52; the motor output shaft 11 drives the connector 2 to rotate; the connector 2 drives the first rotating shaft 42 and the impeller 41 to rotate; and the connector 2 is decelerated by the speed reducer 3 to drive the second rotating shaft 52 and the driving wheel 51.

Figure 4:
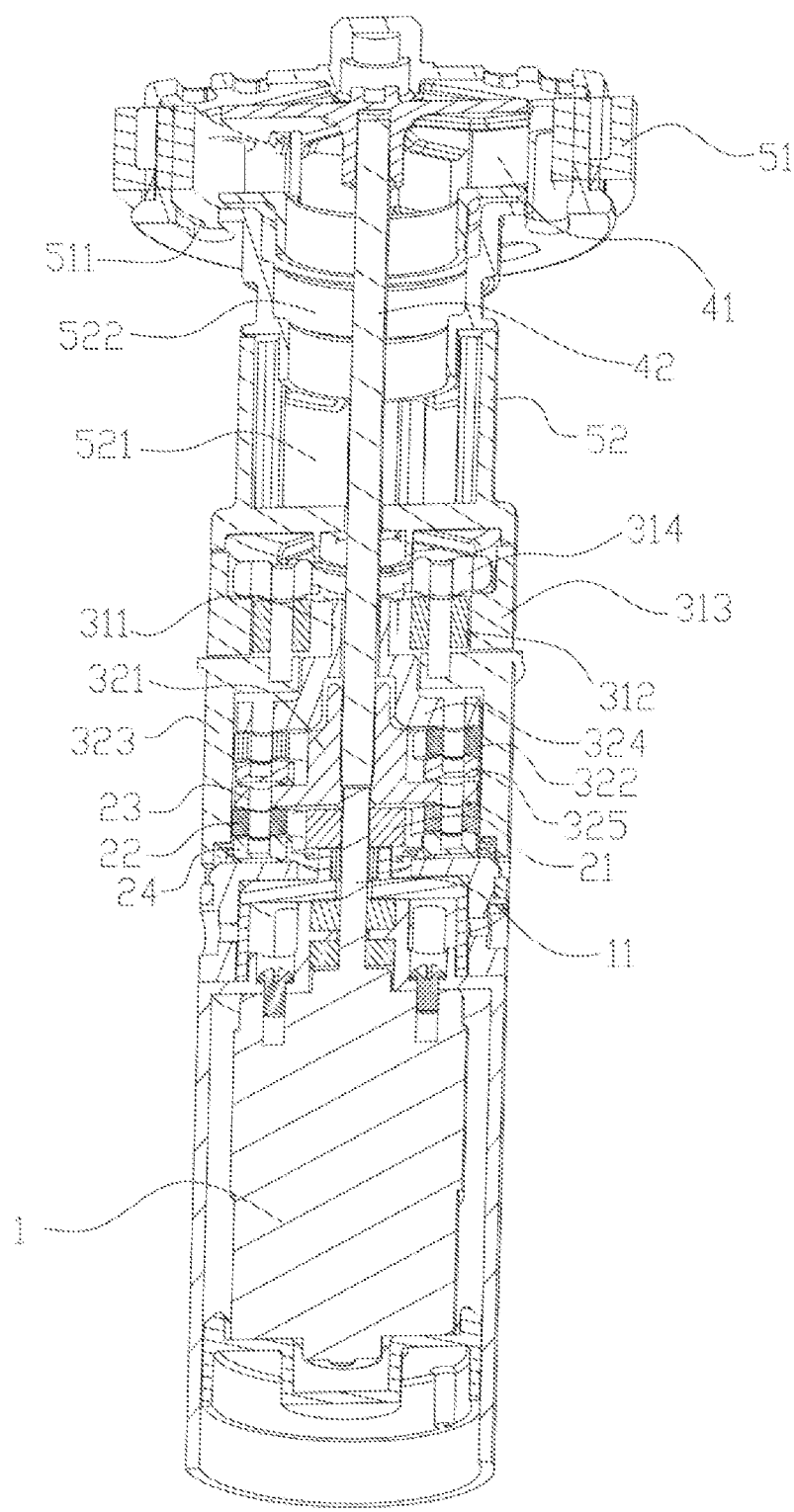
FIG. 4 is a schematic diagram of a full section structure of FIG. 2.

In the present embodiment, as shown in FIG. 4, the second rotating shaft 52 and the first rotating shaft 42 are located on the same axis; and the speed reducer 3 is a planetary gear reduction mechanism.

Figure 5:
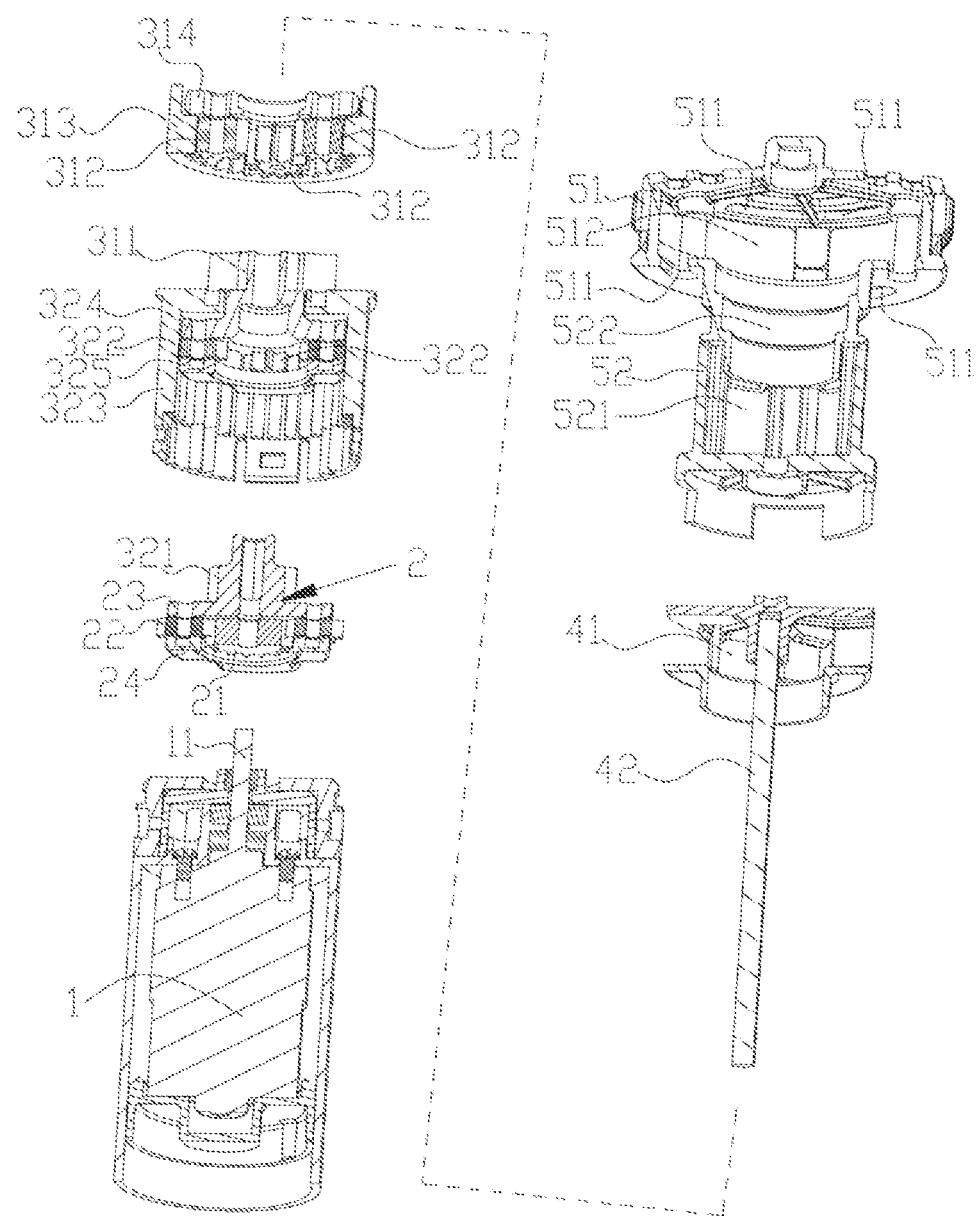
FIG. 5 is an exploded schematic diagram of FIG. 4.
Figure 6:
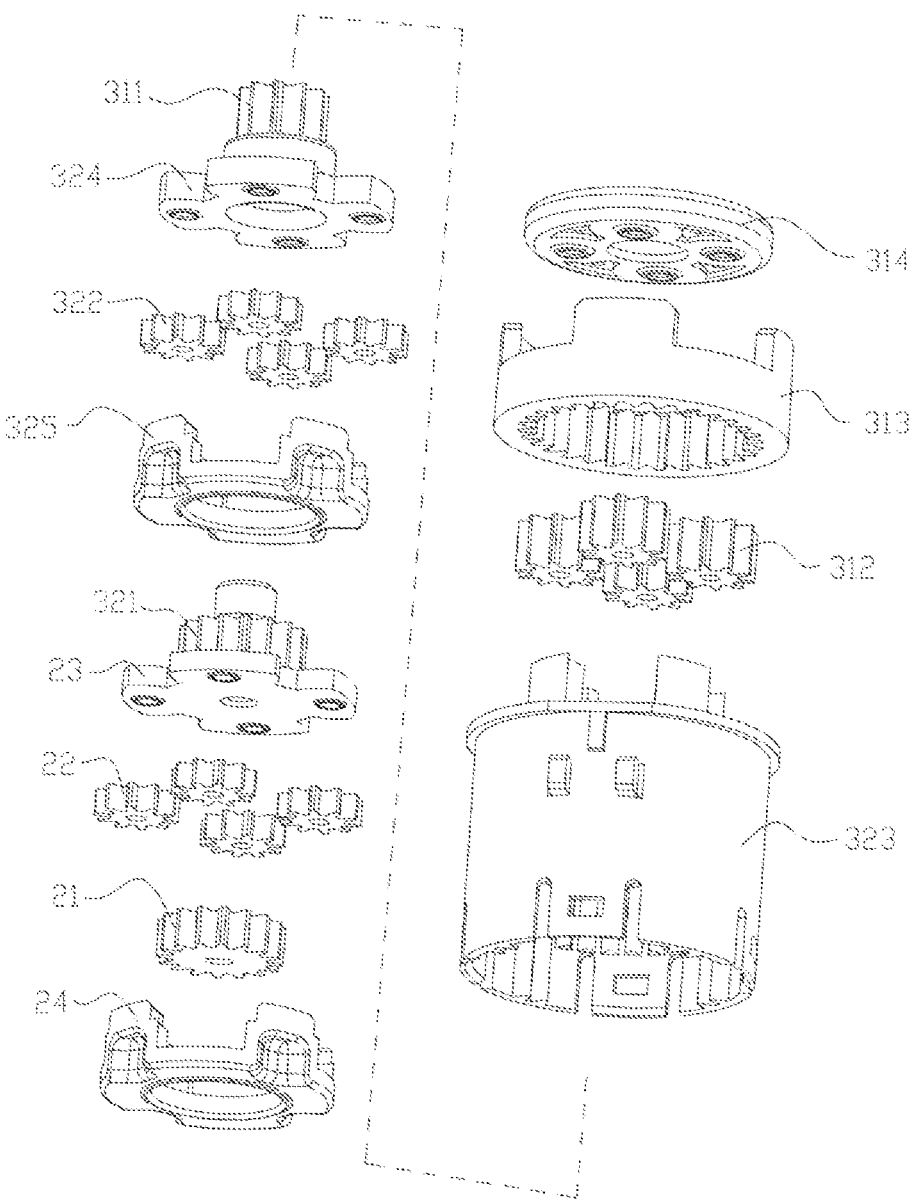
FIG. 6 is an exploded schematic diagram of a connector and a speed reducer in the embodiment 4.
Figure 7:
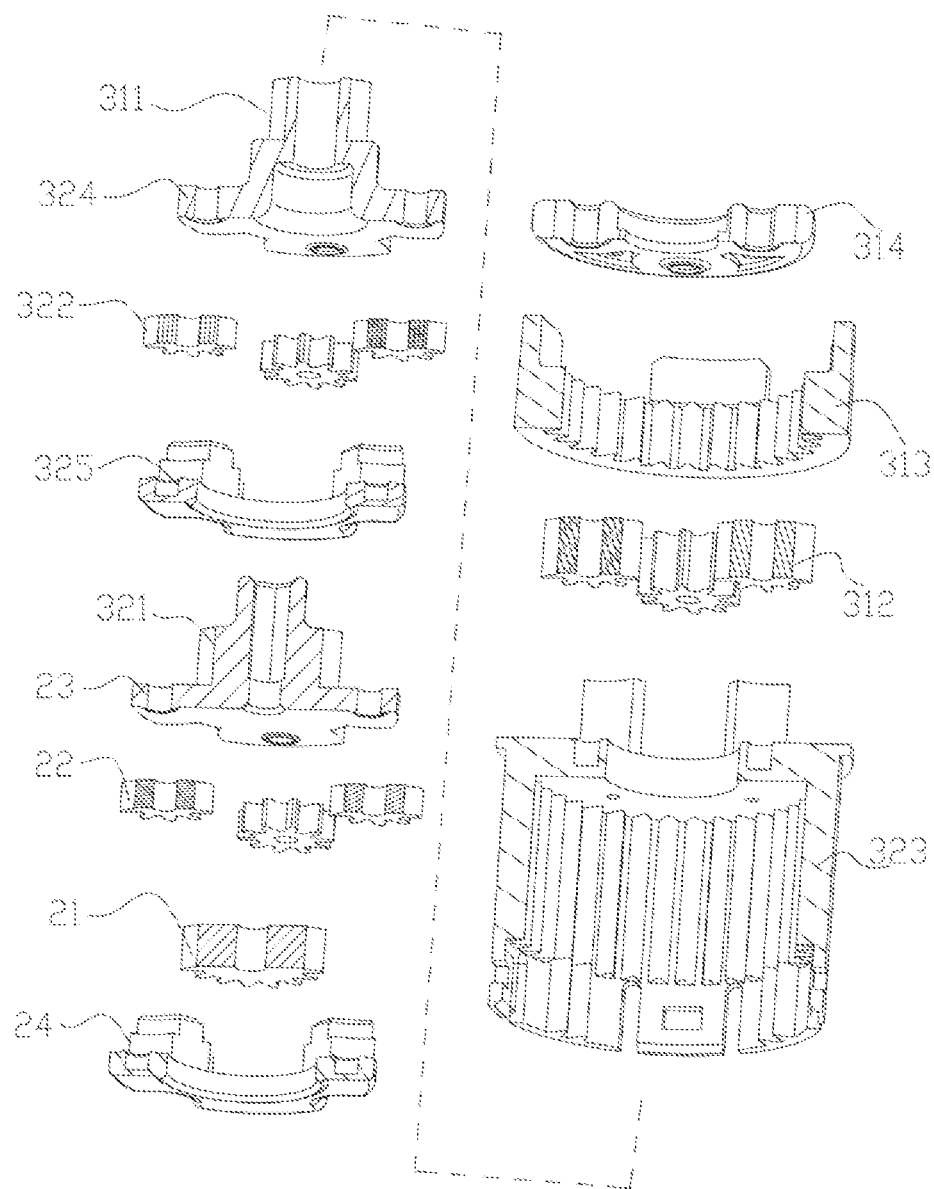
FIG. 7 is a schematic diagram of a full section structure of FIG. 6.
Figure 8:
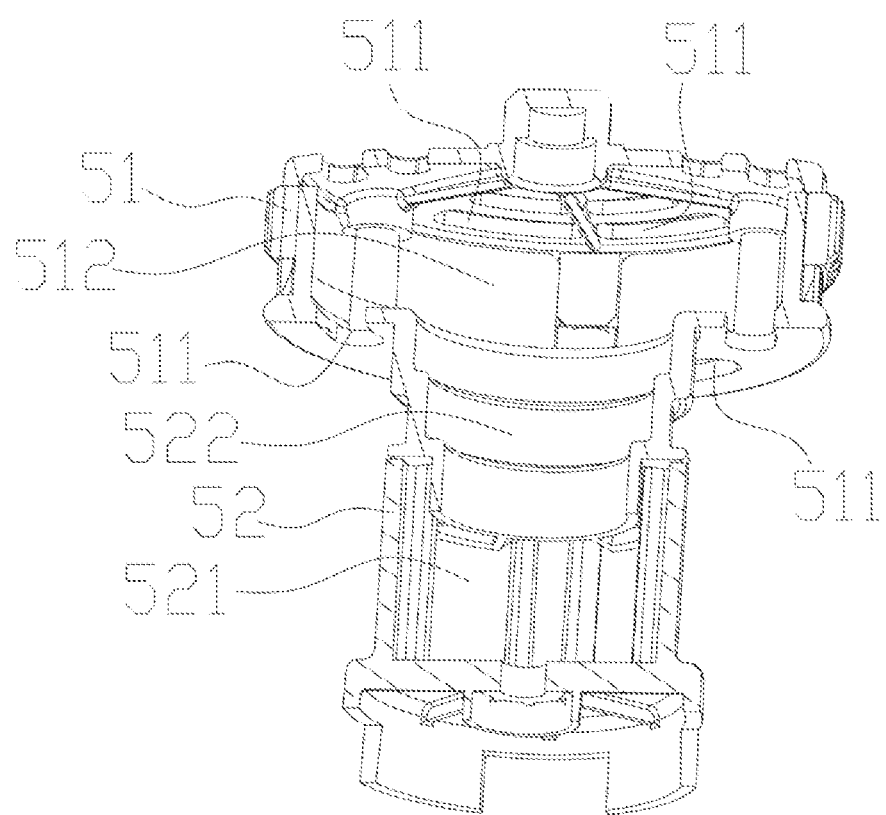
FIG. 8 is an enlarged schematic diagram of a driving wheel and a second rotating shaft in FIG. 5.

In the present embodiment, as shown in FIGS. 4 and 5, the cavity 512 is located in the driving wheel 51; and the discharge ports 511 are located on the driving wheel 51. The first channel 521 is located on the second rotating shaft 52. A second channel 522 for communicating the first channel 521 with the cavity 512 is arranged in the second rotating shaft 52. The second rotating shaft 52 is sleeved on the periphery of the first rotating shaft 42. The planetary gear reduction mechanism is provided with a shaft hole for allowing the rotation of the first rotating shaft 42. Air or water filtered by the filter element 6 enters the second channel 522 through the first channel 521, then enters the cavity 512, and finally is discharged from the equipment through the discharge ports 511. The impeller 41 is arranged in the driving wheel 51 to further reduce the space occupied by the impeller 41. The discharge ports 511 are formed in both sides of the driving wheel 51.

In the present embodiment, the planetary gear reduction mechanism includes a first planetary gear reducer 31 and a second planetary gear reducer 32. The second planetary gear reducer 32 includes a fixed second internal gear ring 323, a second planetary gear 322 and a second sun gear 321 which are arranged in the second internal gear ring 323, and a second planetary frame 324 arranged between the second sun gear 321 and the first planetary gear reducer 31. The first planetary gear reducer 31 includes a first sun gear 311 arranged on the second planetary frame 324, a first internal gear ring 313 synchronously connected to the second rotating shaft 52, and a first planetary gear 312 with a rotating shaft arranged on the second internal gear ring 323. The connector 2 includes a third sun gear 21 fixed on the motor output shaft 11, a third planetary gear 22 in meshing transmission with the third sun gear 21 and the second internal gear ring 323, and a fourth planetary frame 23 arranged between the third sun gear 21 and the second planetary gear reducer 32. The second sun gear 321 is arranged on the fourth planetary frame 23; and the first rotating shaft 42 is fixed on the fourth planetary frame 23. The second internal gear ring 323 is fixed with a motor 1.

In the present embodiment, a fifth planetary frame 24 fixed on the fourth planetary frame 23 is arranged between the third planetary gear 22 and the motor 1. A third planetary frame 325 fixed on the second planetary frame 324 is arranged between the second planetary gear 322 and the fourth planetary frame 23. A first planetary frame 314 fixed on the second internal gear ring 323 is arranged between the first planetary gear 312 and the impeller 41.

In the present embodiment, the first channel 521 is located on a peripheral wall of the second rotating shaft 52. When the second rotating shaft 52 rotates, on the one hand, a negative pressure can be formed so that sewage can easily enter the filter element 6; and on the other hand, an edge of the first channel 521 can cut air or water to reduce the burden on the impeller 41 so that air or water can enter the cavity 512 more easily.

In the present embodiment, the third sun gear 21 is integrated with the fourth planetary frame 23; and the first sun gear 311 is integrated with the second planetary frame 324.

In the embodiment 4, the driving wheel 51 rotates as follows: the motor output shaft 11 synchronously drives the third sun gear 21 to rotate; the third sun gear 21 drives the third planetary gear 22 to rotate along an inner wall of the second internal gear ring 323; the third planetary gear 22 drives the fourth planetary frame 23 to rotate; and then the second sun gear 321 on the fourth planetary frame 23 rotates synchronously with the fourth planetary frame 23. The second sun gear 321 drives the second planetary gear 322 to rotate along the inner wall of the second internal gear ring 323; the second planetary gear 322 drives the second planetary frame 324 to rotate; and then the first sun gear 311 on the second planetary frame 324 synchronously rotates with the second planetary frame 324. The first sun gear 311 drives the planetary gear 312 to rotate on the own axis; the first planetary gear 312 drives the first internal gear ring 313 to rotate in a circumferential direction; and the first internal gear ring 313 drives the second rotating shaft 52 to rotate, and finally drives the driving wheel 51 to rotate.

In the embodiment 4, the impeller 41 rotates as follows: the fourth planetary frame 23 directly drives the first rotating shaft 42 to rotate, and finally drives the impeller 41 to rotate.

In the embodiment 4, pollutants are absorbed and purified as follows: air or water filtered by the filter element 6 enters the second channel 522 through the first channel 521, then enters the cavity 512, and finally is discharged to the outside through the discharge ports 511.

The preferred embodiments of the present invention have been illustrated, and various variations or modifications made by those ordinary skilled in the art will not depart from the scope of the present invention.

What is claimed is:

1. A cleaning robot capable of simultaneously driving a driving wheel and an impeller by a single motor, comprising a driving wheel (51), an impeller (41), a cavity (512) for accommodating the impeller (41), and discharge ports (511) for communicating the cavity (512) with the outside, wherein the impeller (41) is provided with a first rotating shaft (42); the driving wheel (51) is provided with a second rotating shaft (52); a first channel (521) is arranged between the cavity (512) and the filter element (6); a connector (2) is connected between the motor output shaft (11) and the first rotating shaft (42); and a speed reducer (3) is connected between the connector (2) and the second rotating shaft (52).

2. The cleaning robot capable of simultaneously driving the driving wheel and the impeller by the single motor according to claim 1, wherein the connector (2) is a fixed part synchronously connected with the motor output shaft (11) and the first rotating shaft (42); the second rotating shaft (52) is parallel to the first rotating shaft (42); and the speed reducer (3) is a planetary gear reduction mechanism.

3. The cleaning robot capable of simultaneously driving the driving wheel and the impeller by the single motor according to claim 1, wherein the connector (2) is a fixed part synchronously connected with the motor output shaft (11) and the first rotating shaft (42); the second rotating shaft (52) is parallel to the first rotating shaft (42); and the speed reducer (3) is a belt pulley.

4. The cleaning robot capable of simultaneously driving the driving wheel and the impeller by the single motor according to claim 1, wherein the connector (2) is a planetary gear reduction mechanism connected with the motor output shaft (11) and the first rotating shaft (42); the second rotating shaft (52) is parallel to the first rotating shaft (42); and the speed reducer (3) is a belt pulley.

5. The cleaning robot capable of simultaneously driving the driving wheel and the impeller by the single motor according to claim 1, wherein the second rotating shaft (52) and the first rotating shaft (42) are located on the same axis, and the speed reducer (3) is a planetary gear reduction mechanism.

6. The cleaning robot capable of simultaneously driving the driving wheel and the impeller by the single motor according to claim 5, wherein the second rotating shaft (52) is sleeved on the periphery of the first rotating shaft (42); the cavity (512) is located in the driving wheel (51); the discharge ports (511) are located on the driving wheel (51); the first channel (521) is located on the second rotating shaft (52); a second channel (522) for connecting the first channel (521) with the cavity (512) is arranged in the second rotating shaft (52); and the planetary gear reduction mechanism is provided with a shaft hole for allowing the rotation of the first rotating shaft (42).

7. The cleaning robot capable of simultaneously driving the driving wheel and the impeller by the single motor according to claim 6, wherein the planetary gear reduction mechanism comprises a first planetary gear reducer (31) and a second planetary gear reducer (32); the second planetary gear reducer (32) comprises a fixed second internal gear ring (323), a second planetary gear (322) and a second sun gear (321) which are arranged in the second internal gear ring (323), and a second planetary frame (324) arranged between the second sun gear (321) and the first planetary gear reducer (31); the first planetary gear reducer (31) comprises a first sun gear (311) arranged on the second planetary frame (324), a first internal gear ring (313) synchronously connected to the second rotating shaft (52), and a first planetary gear (312) with a rotating shaft arranged on the second internal gear ring (323); the connector (2) comprises a third sun gear (21) fixed on the motor output shaft (11), a third planetary gear (22) in meshing transmission with the third sun gear (21) and the second internal gear ring (323), and a fourth planetary frame (23) arranged between the third sun gear (21) and the second planetary gear reducer (32); the second sun gear (321) is arranged on the fourth planetary frame (23); and the first rotating shaft (42) is fixed on the fourth planetary frame (23).

8. The cleaning robot capable of simultaneously driving the driving wheel and the impeller by the single motor according to claim 7, wherein a fifth planetary frame (24) fixed on the fourth planetary frame (23) is arranged between the third planetary gear (22) and the motor (1); a third planetary frame (325) fixed on the second planetary frame (324) is arranged between the second planetary gear (322) and the fourth planetary frame (23); and the first planetary frame (314) fixed on the second internal gear ring (323) is arranged between the first planetary gear (312) and the impeller (41).

9. The cleaning robot capable of simultaneously driving the driving wheel and the impeller by the single motor according to claim 7, wherein the first channel (521) is located on a peripheral wall of the second rotating shaft (52).

10. The cleaning robot capable of simultaneously driving the driving wheel and the impeller by the single motor according to claim 8, wherein the first channel (521) is located on a peripheral wall of the second rotating shaft (52).

\* \* \* \* \*